Figure 5:
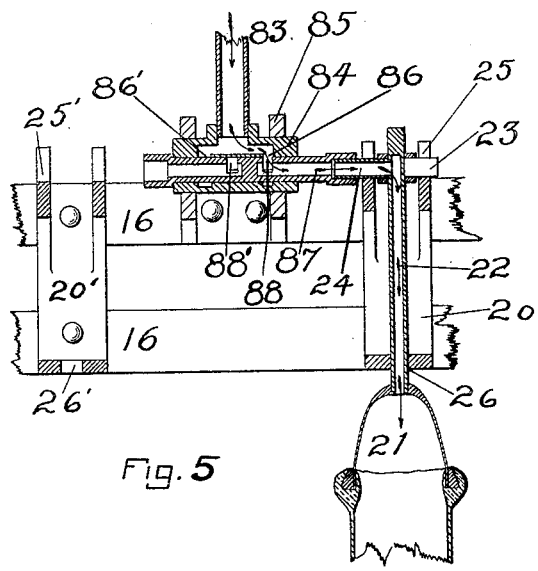

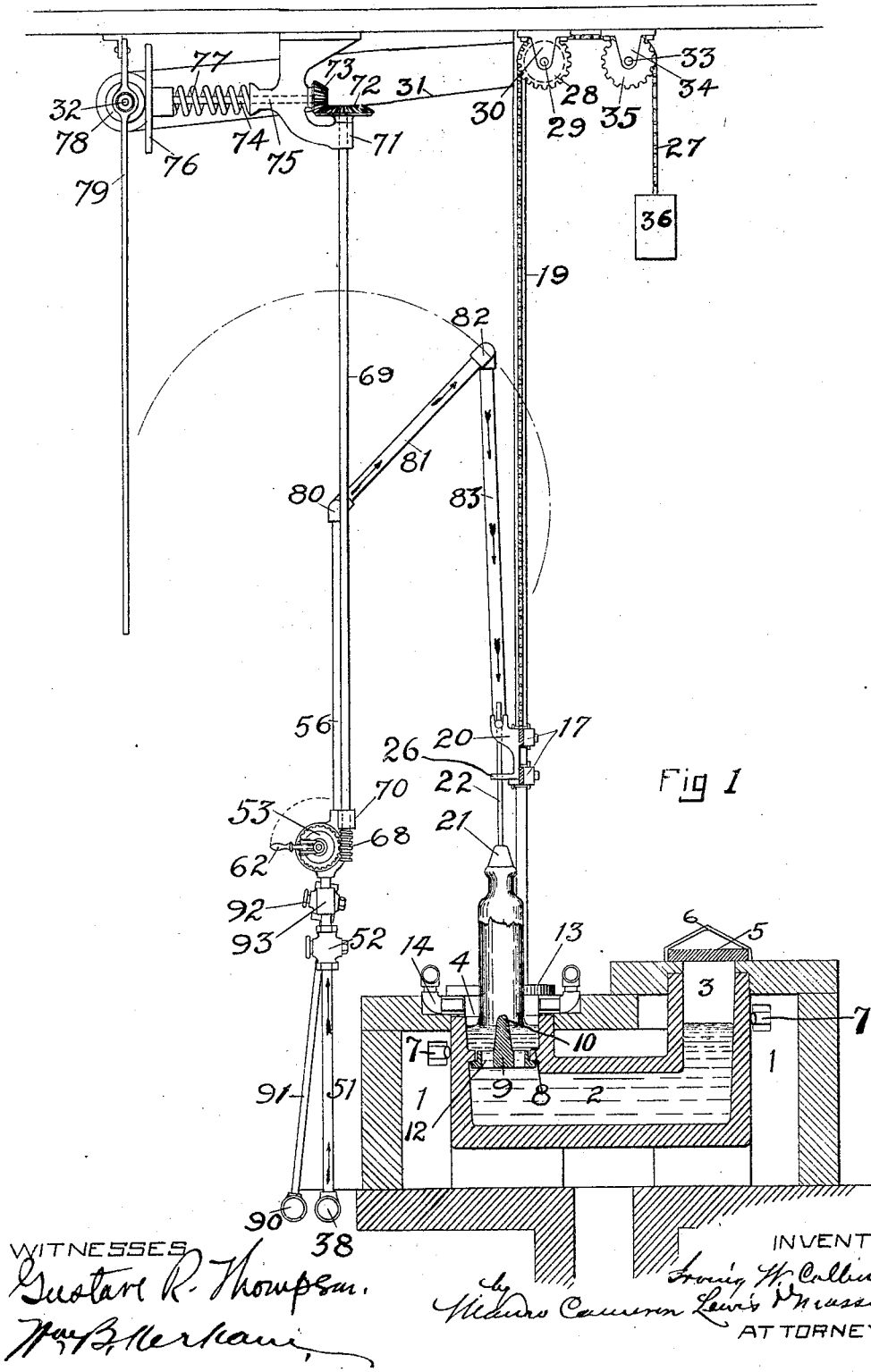

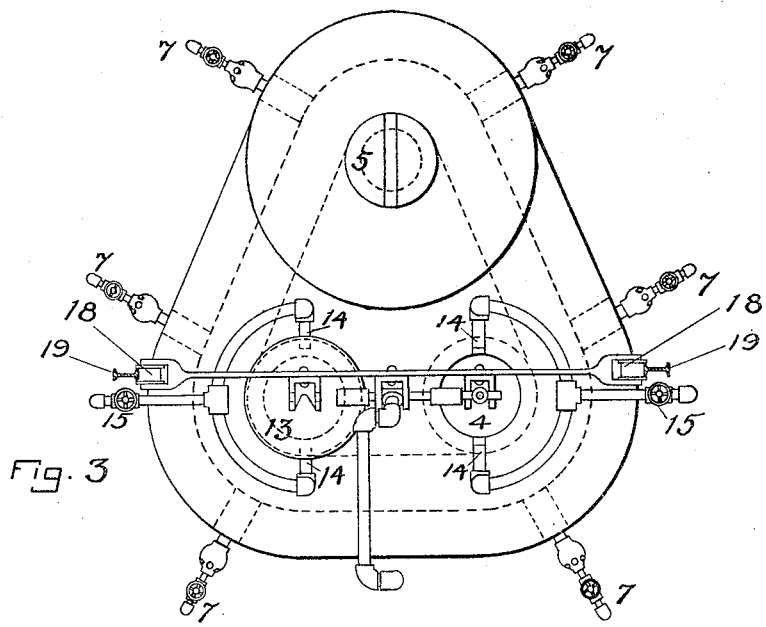
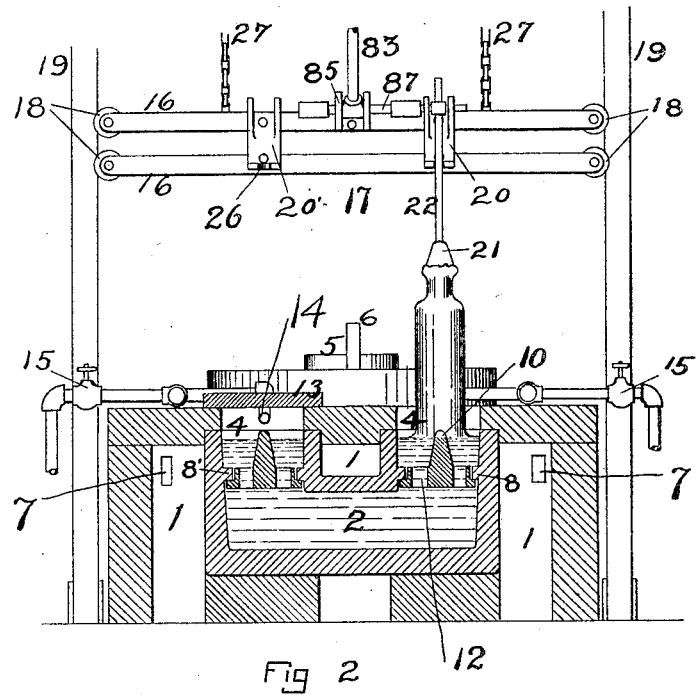

No. 805,055. PATENTED NOV. 21, 1905.
I. W. COLBURN.
GLASS DRAWING APPARATUS.
APPLICATION FILED APR. 22, 1904.

4 SHEETS—SHEET 3.

WITNESSES
INVENTOR
ATTORNEYS

UNITED STATES PATENT OFFICE.

IRVING W. COLBURN, OF FRANKLIN, PENNSYLVANIA.

GLASS-DRAWING APPARATUS.

No. 805,055.                    Specification of Letters Patent.                Patented Nov. 21, 1905.

Application filed April 22, 1904. Serial No. 204,435.

*To all whom it may concern:*

Be it known that I, IRVING W. COLBURN, of Franklin, Pennsylvania, have invented a new and useful Glass-Drawing Apparatus, which invention is fully set forth in the following specification.

This invention relates to the art of glass-working, and more particularly to the art of drawing cylinders or rollers of glass from the molten metal.

The object of the invention is to provide means whereby a cylinder or roller of glass can be rapidly drawn with a minimum of skilled labor and at the same time produce cylinders or rollers of uniform thickness and diameter and with smooth surfaces free from unevenness and flaws.

With this object in view the invention consists of a method and apparatus for drawing said cylinders. Generally speaking, the method consists in providing a mass of molten metal, within which a floater of refractory material is located, having a portion or conical point extending above the surface of the molten metal and then introducing into the surface of the molten metal a circular bait suitably prepared and after the metal has become attached to the bait drawing the same upward, so that the formed cylinder shall surround the upwardly-projecting point of the floater before mentioned. During the drawing process air is supplied under pressure to the interior of the cylinder, the pressure of the air which is supplied gradually increasing as the cylinder is elongated. Means are provided whereby the air-pressure thus supplied to the interior of the cylinder can be regulated either automatically or by hand. After the cylinder has been drawn to the desired length the air is withdrawn from the cylinder by the operation of an exhaust, thereby causing the glass at the lower end of the cylinder, which is in a plastic condition, to collapse or be drawn inward to a point around and in contact with the upwardly-projecting point of the floater above mentioned. This having been accomplished, the pointed end of the cylinder is severed from the molten metal in any suitable way, preferably by directing a jet of flame against the point or thread of glass adjacent to said point.

The apparatus employed preferably consists of a heating-chamber having a plurality of working pots or openings, two being shown, and a filling-opening, to the end that while one of the openings is covered and being heated to bring the glass to the best condition for working the drawing operation may be going on from another one of said openings.

The invention also consists in the provision of suitable valves for regulating the pressure of the air within the cylinder during the drawing operation and automatic apparatus for operating the same, as well as means for enabling said valve to be manipulated by hand.

The method followed, as well as the apparatus employed, may be varied somewhat, and in the accompanying drawings I have illustrated one form which the apparatus may assume, though it will be understood that various mechanical expressions may be given to the inventive idea involved without departing from the spirit of the invention.

Figure 6:
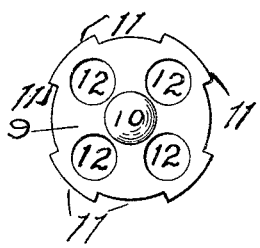
Figure 4:
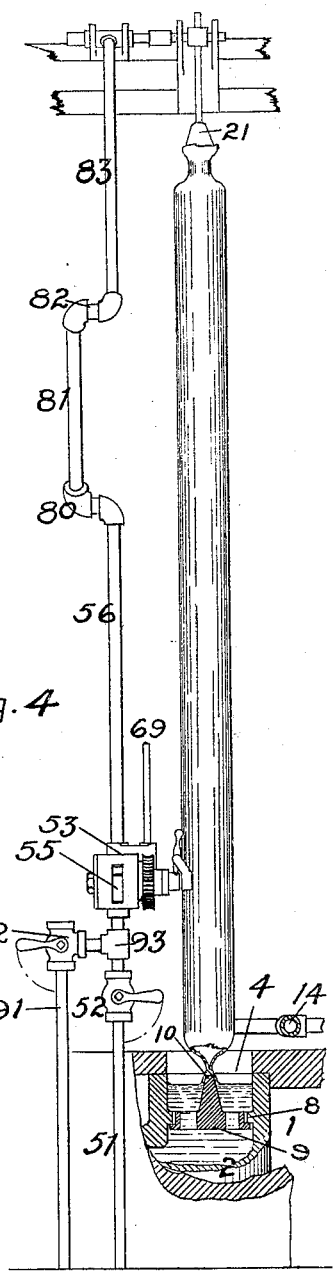
Figure 7:
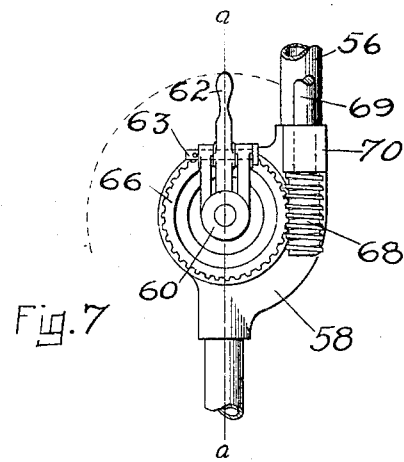
Figure 8:
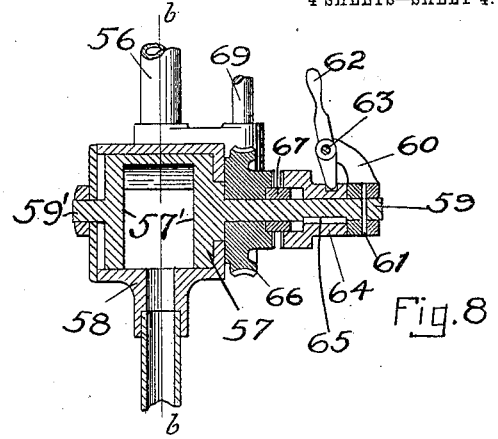
Figure 9:
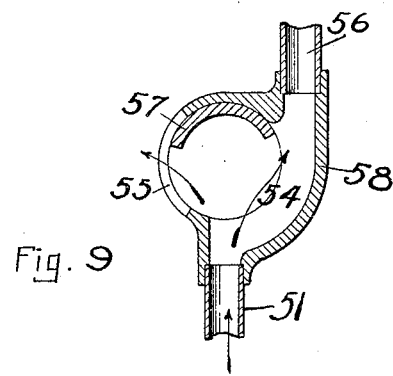
Figure 10:
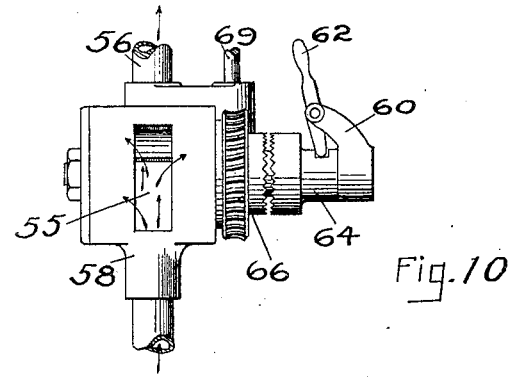
Figure 11:
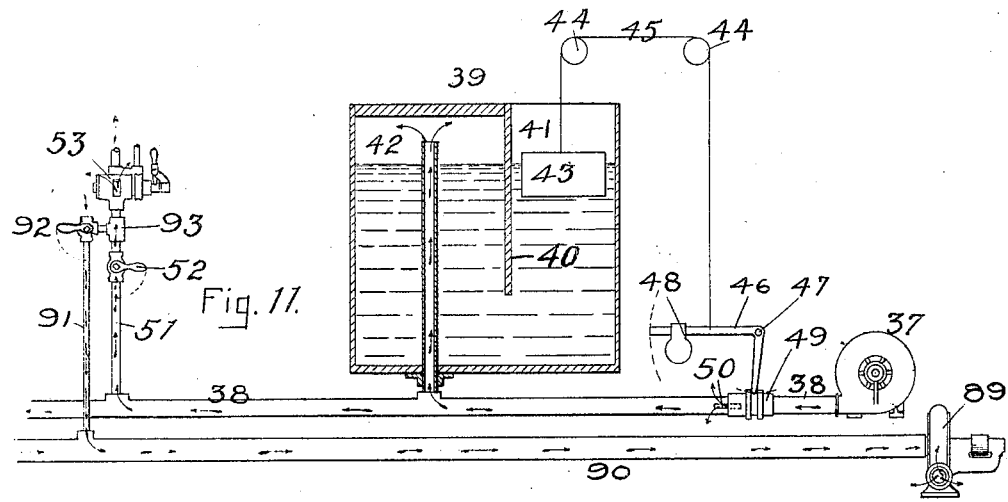

Referring to the drawings, Figure 1 is a side elevation with parts, including the feeding-chamber, working pots, and floater, shown in cross-section. Fig. 2 is a view substantially at right angles to Fig. 1, showing parts of the apparatus in side elevation and parts in section. Fig. 3 is a top plan view of the apparatus. Fig. 4 is a side elevation, partly in broken section, showing the glass cylinder complete and just before it is severed from the point or apex of the floater. Fig. 5 is a broken sectional view illustrating the means of connecting the bait with the air-conduits for supplying the air-pressure to the interior of the cylinder. Fig. 6 is a top plan view of the floater. Fig. 7 is a side elevation of the valve mechanism for controlling the air-pressure to the interior of the cylinder; and Figs. 8 and 9 are central sectional views through said valve, the two views being taken at right angles to each other. Fig. 10 is an elevation at right angles to Fig. 7; and Fig. 11 is a side elevation, partly in section, showing the air-reservoir and other apparatus employed for regulating the air-pressure within the cylinder.

Referring to the drawings, and particularly to Figs. 1, 2, and 3, the heating-chamber is indicated by the reference-numeral 1, this chamber being designed to surround the working pot 2, which is provided with a filling-in opening 3 and a plurality of working openings 4. (Here shown as two in number.) A suitable cover 5 is provided for closing the filling-in opening 3, a bail or handle-piece 6 being attached to said cover for facility in handling the same. Any suitable means may be provided for supplying the heat to the heating-chamber 1, as gas-jets 7, opening into said chamber over the exterior, as will be clearly understood from an inspection of Figs. 2 and 3. Within each working opening 4 is provided a series of inwardly-projecting symmetrically-arranged lugs 8, arranged to engage corresponding lugs upon the floater 9. This floater has the lugs 11 symmetrically arranged and so spaced that when the floater is placed in position in the working openings 4 the lugs upon the floater may enter between the lugs 8 in the openings, and after the floater has been pushed downward far enough so as to bring the lugs on the floater below the lower surface of the lugs 8 in the working openings the floater is given a one-eighth turn, so that the lugs thereon will be underneath the lugs in the working openings and will thereby prevent the floater from rising higher than is desired. It should be stated that the floater is made of any suitable refractory material whose specific gravity is less than that of the molten glass. This floater has a central portion or point 10 projecting upward, so as to come slightly above the surface of the molten glass when it is at the working level in the openings 4. The floater is also provided with a plurality of symmetrically-arranged openings 12, which permit the molten glass to rise upward through the floater around the point of projection 10. A cover 13 is designed to close the working opening when the same is not in use and facilitate the heating of the glass and can be removed at will. One of these covers is shown in position in Fig. 2 over one of the openings, while it is withdrawn from the opening 4 from which the cylinder is in the act of being drawn. Suitable burners 14, Figs. 2 and 3, are provided for heating the molten glass above the floater, said burners being controlled by valves 15, provided for that purpose.

The drawing apparatus is here shown as consisting of two bars 16 16, united to form a cross-head 17, which cross-head is provided with rollers 18, traveling upon a pair of upright ways or supports 19, arranged on opposite sides of the apparatus. The two bars 16 are united by a pair of bait-head supports 20, riveted or otherwise rigidly connected to said bars, and the bait 21 is carried by said supports 20 by means of a pipe or tube 22, carried on a pair of trunnions 23 24, resting in the forked upper ends 25 of the bait-supports. The trunnion 23 is solid, whereas the trunnion 24 is hollow, for a purpose which will be hereinafter described. For the purpose of holding the bait in a perfectly vertical position the lower portion of the bait-tube 22 enters into a fork or slot 26, formed in the lower end of the bait-support 20, as will be understood from an inspection of Figs. 1 and 5. For the purpose of raising and lowering the cross-head 17 suitable flexible connections, as sprocket-chains 27, are attached to the cross-head near the respective ends thereof, which chains are passed over sprocket-wheels 28, carried on shafts 29, supported in suitable brackets or bearings 30, located above the working pot a sufficient distance to permit the cylinder to be drawn to the desired length. The sprocket-wheels 28 are driven in any suitable manner, as by a belt 31, running from said sprockets to a suitable driving-pulley on a power-shaft 32. For the purpose of taking the slack out of the sprocket-chains as the cross-head is elevated idler-sprockets 35, carried by shaft 33 in bearings 34, are provided, and a suitable weight 36 is attached to the end of the sprocket-chains 27, which weight will operate to keep the chain between the weight and the sprocket-wheel 28 taut and free from kinks.

Referring now to Figs. 7, 8, 9, 10, and 11, the air-pressure supplied to the cylinders in the act of being drawn is provided by any suitable compressing apparatus, here illustrated as a fan 37, from which a pipe 38, to supply as many machines as desired, a branch pipe connecting it, leads to a reservoir 39, which reservoir is provided with a partition 40, which depends from the top thereof toward its bottom, so as to divide the upper portion of the reservoir into two chambers, one of which, 41, is open at the top to the atmosphere and the other of which, 42, is closed to the atmosphere. This reservoir 39 is partially filled with any suitable liquid, as water or oil, and has a branch from the lead-pipe 38, extending up above the surface of the liquid within the closed chamber 42 of the reservoir. A float 43 is placed in the liquid within the open chamber 41 and has attached thereto a flexible line or cable 45, passing over idlers or sheaves 44 44 and having its lower end secured to one arm of a bell-crank lever 46, pivoted in its angle at 47, the horizontal arm of the bell-crank lever being supplied with a weight 48, while the vertical arm is in engagement with a sleeve-valve 49, surrounding the lead-pipe 38 and acting as a valve to control the slotted opening 50 in said lead-pipe. It will be apparent that when the float 43 descends it will act to elevate the arm 46 of the bell-crank lever, (since the weight of the float 43 when unsupported exceeds that of the weight 48,) and thereby actuate the sleeve-valve 49 to close or partially close slotted valve opening or port 50 in the lead-pipe. Reversely, when the float 43 ascends the bell-crank lever, actuated by the weight 48, will operate to throw the sleeve-valve 49 to the right, tending to uncover the slotted opening 50 in the lead-pipe. When the said port 50 is closed, the escape of air therethrough from the lead-pipe 38 is prevented, and the air from the fan is thus forced through the lead-pipe 38 toward the reservoir 39 and the pressure-regulating valve 53.

When, however, the port 50 is more or less open, air escapes through said port, thereby reducing the pressure of the column of air flowing to the reservoir 39 and regulating-valve 53.

Leading from the lead-pipe 38 is a branch pipe 51, provided with an ordinary valve 52 for opening or closing the pipe 51. It will be understood that the lead-pipe 38 may be extended along the front or in proximity to a plurality of machines for drawing the cylinders and that at each machine a branch pipe 51 is provided. Only one is shown in the present instance, as this will be sufficient to illustrate the invention.

For the purpose of regulating the air-pressure supplied to the cylinder as the same is being drawn a pressure-regulating valve 53 is connected to the pipe 51. The construction of this valve and its method of operation will be best understood from the illustrations shown in Figs. 7, 8, 9, and 10. The valve-chamber 54 is connected directly to the pipe 51 and also to the pipe 56, leading to the drawing-bait, and this chamber 54 is provided with a slot or opening 55, Figs. 9 and 10, leading to the atmosphere, such slot being formed in the valve-casing 58 and controlled by a valve 57, which valve is arc-shaped, as shown, to turn within the valve-casing, so as to control the exit-port 55 without cutting off the passage of air through the chamber 54 from the pipe 51 to the pipe 56. The arc-shaped valve 57 is secured to two disks 57', Fig. 8, fitting snugly, so as to turn within the valve-casing 58 and having suitable stems 59 59' projecting outward from the disks. Stem 59' simply affords a trunnion-like bearing for one of the disks 57'. The stem 59, however, is prolonged, and it is to this stem that the means for operating and controlling the valve are attached. A bracket 60, preferably having forked arms, is secured, as by a pin 61, to the stem 59, and between the forked arms of said bracket is mounted a handle 62 upon a pivot or shaft 63, having bearing in the forked arms of the bracket 60. The lower end of this handle 62 engages in a slot 65, formed on the sleeve 64, sliding upon the valve-stem 59, which sleeve is prevented from turning on the stem by means of a key 65. A worm-gear 66 is mounted on the stem 59 and held in position by a collar 67, which worm-gear is engaged by a worm 68 on the lower end of a shaft 69, having a bearing 70 upon the valve-casing 58 and a bearing 71 in a bracket 75, Fig. 1, secured in position to the ceiling or an overhanging beam, and a bevel-gear 72 on said shaft 69 is engaged by a bevel-gear 73 on a shaft 74, turning in a suitable bearing in said bracket 75. On the end of the shaft 74 is secured a disk 76, a spring 77 reacting between said disk and the bracket 75 to press the same outward from the bracket. This disk 76 is operatively engaged by a disk 78, splined on shaft 32. Regulating-lever 79 is fulcrumed above disk 78 and engages the hub of the latter, (preferably by passing through a slot in the hub,) so that the disk 78 can be moved transversely across the face of the disk 76, and thereby regulate the speed at which the latter is driven.

Referring now to Figs. 8 and 10, it will be observed that clutch-teeth are formed upon the sleeve 64 and upon the worm-gear 66 and that when the parts are in the position shown in Figs. 8 and 10 by grasping the handle 62 the workman may turn the sleeve 64, and with it the valve-stem 59 and the valve 57, so as to move said valve to close the port 55 to any desired degree. It will also be observed that by throwing the handle 62 to the right in Figs. 8 and 10 the sleeve may be clutched to the worm-gear 66, when the worm will operate the valve 57, so as to cause the latter to slowly move across the port 55 and gradually close the same.

Referring to Figs. 4 and 5, 80 is a flexible joint connecting the pipe 56 with a pipe 81, and 82 is another flexible joint connecting said pipe 81 with a pipe 83, which pipe 83 is connected to a hollow sleeve 84, mounted in brackets 85, supported on the upper cross-bar 16. Within said sleeve 84 is a conduit having near its opposite ends by-pass ports 86 86', and slidably mounted within the sleeve is a tube 87, having two ports 88 88' formed therein at a distance apart somewhat less than that of the distance between the ports 86 86', leading from the interior of the sleeve 84. This tube 87 projects at its ends outside of the sleeve 84 and is capable of sliding longitudinally within the sleeve. When thrown to its extreme right-hand position, the port 88 in said tube registers with the port 86 in the sleeve, and the port 88' is out of register with the port 86' within the sleeve. This position is shown in Fig. 5. Conversely, when the tube is thrown to its extreme left-hand position the port 88' in the tube registers with the port 86' in the sleeve and the port 88 is out of register with the port 86. The tube 87 is so mounted as to be in alinement with the hollow trunnion 24, supporting the bait 21, and when the tube is thrown to its extreme right-hand position, as shown in Fig. 5, it telescopes with said hollow trunnion, suitable packing being preferably provided to make the joint air-tight, whereupon air flows from the pipe 83 through the sleeve and registering ports, the hollow trunnion, and the tubular bait-support 22 to the interior of the cylinder, as will be readily understood by following the index-arrows in Fig. 5. In case it is desired to remove the bait the tube is slipped to the left and the trunnions supporting the bait are readily lifted from the forks 25 of the bait-support 20. It will be readily understood that when the bait is placed in the left-hand bait-support 20' with its hollow trunnion 24 projecting toward the tube 87 by slipping the tube 87 to the left it may be caused to telescope over the hollow trunnion 24 of the bait, and the air will then pass to the left via the various ports and conduits to the bait, after the manner shown on the right-hand side in Fig. 5.

For the purpose of exhausting the air from the cylinder after the same has been withdrawn to the desired length, and thereby permitting the cylinder to collapse at its lower end or be drawn to a point, as shown in Fig. 4, and then off of the conical projection 10 of the floater, I provide an exhaust-fan 89, Fig. 11, connected to the lead-pipe 90, from which lead-pipe branches, as 91, extend upward to a valve 92, whose casing is connected, as by the T 93, to the pipe 51. The valve 92 is an ordinary three-way cock, and its casing is open at the upper side to the atmosphere, and this valve may be turned in such manner as to permit air to enter the pipe 91 through the valve 92, as indicated by the arrows in Fig. 11. By throwing the valve 92 downward, however, its casing may be shut off from the atmosphere, and instead of the fan 89 sucking the air from the atmosphere the pipe 91 is directly connected to the pipe 51 and thence through the various connecting pipes and conduits, and the bait with the interior of the hollow drawn cylinder and the fan 89 then acts to suck or withdraw the air from the interior of the cylinder, whereupon the glass, which has become set along the greater portion of its length, but which is still plastic at its immediate lower end, is caused by the pressure of the external atmosphere to draw to a point at said lower end, as shown in Fig. 4, after which (jets 14 being lighted) continued drawing will entirely sever the cylinder from the molten mass.

Operation: For the purpose of operating the device the jets 7, leading into the heating-chamber 1, are ignited and molten glass is ladeled or otherwise taken from an adjacent furnace and poured into the working pot 2 through the opening 3 until the desired quantity of molten glass is supplied, after which the lid 5 is placed in the position shown in Fig. 1, the floaters 9 having previously been placed in position and the covers 13 having been placed over the working openings 4. The plastic glass within the working chamber having been brought to the proper working condition and the valve 92 having been set so that the fan 89 is drawing from the atmosphere, with the inlet-valve 52 closed and the slot 55 in the regulating-casing wide open, the driving-shaft 32 being set in rotation and the friction-disk 78 so set in relation to the disk 76 as to give the proper speed to the valve 57 and the clutch 64 of the regulating-valve being thrown out of mesh, so that the worm 68 operates without moving the valve, the burners in the working hole 4 which is to be used are turned off, while those in the working hole 4 which is not in use are left in operation. The bait having been previously heated, so that the plastic glass will adhere to it, is now hung in the forked bearings 25 and the tube 87 is adjusted in position to connect to the hollow trunnion 24, as shown in Fig. 5. The parts being thus in position, the bait is lowered into the molten glass and allowed to stand there until the glass has firmly adhered thereto, when air is supplied to the interior of the bait by opening the valve 52, the air-pressure being regulated to suit the conditions by the valve 57 controlling the port 55. The bait is then drawn upward, the air-pressure being first regulated to form a neck portion to the cylinder, as shown in Figs. 1, 2, and 4. This regulation is accomplished by the manual manipulation of the handle 62. The neck portion having been formed, the air-pressure within the cylinder is increased by gradually closing the slot 55 by the regulating-valve 57. The pressure is increased until the cylinder is swollen to the desired diameter. As the cylinder is being drawn the air-pressure therein is gradually increased to keep the cylinder at a uniform diameter. To do this, the clutch on the sleeve 64 is thrown into mesh with the worm-wheel 66. The speed of this wheel has been previously determined by the position of the regulating speed-lever 79, so as to cause the valve 57 to gradually close the port 55, and thus gradually increase the pressure per unit of surface within the cylinder in the proper ratio to the upward speed of the bait. The cross-head 17 is steadily and uniformly moved upward, and when the cylinder has been drawn to the desired length the air-pressure is shut off by closing the valve 52 and the sleeve 64 is thrown out of clutch with the worm and the port 55 is opened. At this point the valve 92 is turned so as to cause the fan 89 to draw air from the interior of the glass cylinder, the rapidity with which the same is withdrawn being controlled by the position of the regulating-valve 57 over the slotted port 55. The burners 14 are lighted, and the glass being hotter at the bottom of the cylinder will draw in by reason of the external pressure being greater than the internal pressure, and the point of the floater 9 being just above the level of the glass the lower end of the cylinder will draw to and pull off from it, after which the glass will draw to a thread and will be readily melted off by the flames from the burner 14, or this portion may be cut off, as with shears, or cracked off, as with a cold iron. This method of severing the lower end of the cylinder leaves the surface of the molten glass in good condition for drawing of another cylinder, as the glass that is left from the cylinder is stuck onto point 10 of the floater 9 and will not foul the surface of the glass in the working opening. When the cylinder is thus detached, the cross-head is allowed to continue its upward travel sufficiently to clear the lower end of the cylinder from the fire-box top when a fork or cross-rod is applied to the cylinder to swing it outward. By lowering the cross-head the bait may be elevated out of its forked supports on the cross-head and the cylinder lowered into a horizontal or other position upon suitable supports. The bait is then separated from the cylinder at the neck by cracking off the glass or in any other suitable manner, after which the cylinder is ready for the usual operation of splitting and flattening to form sheets of glass. In the meantime the cover 13 has been removed from the other working hole 4 to the one which has just been used, and the burners 14 at said open work-hole 4 being turned off another bait, previously heated, is introduced and the operation repeated.

It will be readily perceived that during the operation or at any desired time molten glass may be poured into the filling-hole 3, so as to keep the molten glass in the working pot at or about the same working level during the entire operation.

I have found in practice that the interior pressure per unit of surface required in drawing a cylinder from a body of glass varies with different cylinders. Moreover, I have also found in practice that in drawing a cylinder from a body of molten glass the cylinder is inclined to gradually decrease in diameter as it is being drawn. The surface of the molten glass from which it is drawing is gradually chilling, and thereby rendering the plastic glass stiffer. According to my method of drawing cylinders, wherein I gradually increase the internal pressure on the cylinder per unit of surface, I keep the cylinder of substantially uniform size. This is a matter of much importance, and the regulating-valve 53 which I have herein shown provides a means whereby this gradual increase of the internal pressure per unit of surface may be obtained either through manual manipulation or automatically, as may be desired. This increase of pressure per unit of surface of the interior of the cylinder is to be clearly distinguished from a mere increase of the supply of air furnished to the cylinder to compensate for the increased volume thereof due to its enlargement, since a mere increased supply would not afford that increasing pressure per unit of surface necessary to overcome the stiffening of the plastic glass during the drawing operation.

What is claimed is—

1. In glass-drawing apparatus, the combination of a receptacle containing molten glass, means for drawing a cylinder therefrom, a conduit leading to the interior of said cylinder while it is being drawn, and means supplying a gradually-increasing fluid-pressure to the said conduit during the drawing operation.

2. In glass-drawing apparatus, the combination of a receptacle containing molten glass, means for drawing a cylinder therefrom, a port through which fluid-pressure is supplied to the interior of the cylinder, and means gradually increasing said interior pressure per unit of surface during the drawing operation.

3. In glass-drawing apparatus, the combination of a receptacle containing molten glass, means for drawing a cylinder therefrom, a port through which fluid-pressure is supplied to the interior of the cylinder, and means increasing said interior pressure per unit of surface in proportion as the length of the cylinder increases.

4. In glass-drawing apparatus, the combination of a receptacle for molten glass, means for drawing a cylinder therefrom, a source of fluid-pressure, means maintaining said pressure approximately constant, and a conduit leading from said source of fluid-pressure to the interior of the cylinder during the drawing operation.

5. In glass-drawing apparatus, the combination of a receptacle for molten glass, means for drawing a cylinder therefrom, a source of fluid-pressure, means maintaining said pressure approximately constant, a conduit leading from said source of fluid-pressure to the interior of the cylinder during the drawing operation, and means for varying the degree of pressure within the cylinder during the drawing operation.

6. In glass-drawing apparatus, the combination of a receptacle for molten glass, means for drawing a cylinder therefrom, a source of fluid-pressure, means automatically maintaining said fluid-pressure approximately constant, a conduit leading from said source of fluid-pressure to the interior of the cylinder during the drawing operation, and means for varying the degree of fluid-pressure within the cylinder during the drawing operation.

7. In glass-drawing apparatus, the combination of a receptacle for molten glass, means for drawing a cylinder therefrom, a source of fluid-pressure, means automatically maintaining said fluid-pressure approximately constant, a conduit leading from said source of fluid-pressure to the interior of the cylinder during the drawing operation, and automatic means for varying the degree of fluid-pressure within the cylinder during the drawing operation.

8. In glass-drawing apparatus, the combination of a receptacle for molten glass, means for drawing a cylinder therefrom, a source of fluid-pressure, means maintaining said fluid-pressure approximately constant, a conduit leading from said source of fluid-pressure to the interior of the cylinder during the drawing operation, means limiting the pressure per unit of surface reaching the cylinder at the beginning of the drawing operation, and means increasing the pressure per unit of surface in the cylinder during the drawing operation.

9. In glass-drawing apparatus, the combination of a receptacle for molten glass, means for drawing a cylinder therefrom, a source of fluid-pressure, a conduit leading from said source of pressure to the interior of said cylinder, a vent-port in said conduit, a valve controlling said port, and means controlled by the conduit-pressure and actuating said valve.

10. In glass-drawing apparatus, the combination of a receptacle for molten glass, means for drawing a cylinder therefrom, a source of fluid-pressure, a conduit leading from said source of pressure to the interior of said cylinder, a vent-port in said conduit, a valve controlling said port, and means controlled by the fluid-pressure from the conduit at a point beyond the vent-valve and actuating said valve.

11. In glass-drawing apparatus, the combination of a receptacle for molten glass, means for drawing a cylinder from said receptacle, a source of fluid-pressure, a conduit leading therefrom and in which the pressure is maintained approximately constant, a branch pipe leading from said conduit to the interior of the cylinder being drawn, a vent-port in said branch pipe, and means gradually closing said vent-port as the cylinder is drawn.

12. In glass-drawing apparatus, the combination of a receptacle containing molten glass, means for drawing a cylinder therefrom, and means for exhausting the air or other fluid at will from the interior of said cylinder.

13. In glass-drawing apparatus, the combination of a receptacle containing molten glass, means for drawing a cylinder therefrom, means for supplying fluid under pressure to the interior of the cylinder as drawn, and means exhausting the fluid from the interior of said cylinder at the close of the drawing operation.

14. In glass-drawing apparatus, the combination of a receptacle containing molten glass, means for drawing a cylinder therefrom, a port leading to the interior of said cylinder, and a source of fluid-pressure and an exhaust device each separably connected to said port.

15. In glass-drawing apparatus, the combination of a receptacle containing molten glass, means for drawing a cylinder therefrom, a body of refractory material projecting above the surface of the molten glass within said cylinder, a port leading to the interior of said cylinder, and a source of fluid-pressure and an exhaust device each separably connected to said port.

16. In glass-drawing apparatus, the combination of a receptacle containing molten glass, means for drawing a cylinder therefrom, a port leading to the interior of said cylinder, means for supplying a gradually-increasing pressure per unit of surface to the interior of said cylinder, and an exhaust device, said pressure-supply and exhaust device being each separably connected to said port.

17. In glass-drawing apparatus, the combination of a receptacle containing molten glass, means for drawing a cylinder therefrom, a solid body of refractory material projecting above the surface of the molten glass within said cylinder, and means for exhausting the air or other fluid from the interior of said cylinder, whereby at the close of the drawing operation the cylinder may be drawn to a point in contact with and then off of said solid body and thus severed from the mass of molten glass.

18. In glass-drawing apparatus, the combination of a receptacle containing molten glass, means for drawing a cylinder therefrom, means supplying fluid under pressure within said cylinder as drawn, a solid body of refractory material projecting above the surface of the molten glass within the cylinder, and means for exhausting the air or other fluid from the interior of said cylinder at the close of the drawing operation.

19. In glass-drawing apparatus, the combination of a closed receptacle for molten glass, a filling-opening and a plurality of working openings, with means for drawing a cylinder of glass from said working openings, and a floating body of refractory material in each of said working openings and central to the cylinder as drawn.

20. In glass-drawing apparatus, the combination of a receptacle for molten glass, a working opening therein, a floating body of refractory material in and filling the working opening, ports through said body for the passage of the molten glass, and an upwardly-projecting central point on said body.

21. In glass-drawing apparatus, the combination of a receptacle for molten glass, a working opening therein, a floating mass of refractory material in said opening, means normally restraining the body of said mass below the surface of the molten glass, and a central point on said mass projecting above the surface of the glass.

22. In glass-drawing apparatus, the combination of a closed receptacle for molten glass, a filling-opening therein for supplying molten glass thereto, a plurality of working openings, means for closing the several openings, and means for heating the glass in said receptacle.

23. In glass-drawing apparatus, the combination of a closed receptacle for molten glass, a filling-opening for supplying molten glass thereto, a plurality of working openings thereinto, and means for heating the glass in the body of said receptacle, and other means for heating the glass in said working openings.

24. In glass-drawing apparatus, the combination of a closed receptacle for molten glass, a filling-opening for supplying molten glass thereto, a plurality of working openings thereinto and means for drawing cylinders of glass from said openings, and a floating body of refractory material located in each working opening and central to the cylinder as drawn.

25. In glass-drawing apparatus, the combination of a closed receptacle for molten glass, a filling-opening for supplying molten glass thereto, a plurality of working openings thereinto, and a floating body of refractory material having a portion projecting above the surface of the molten glass at the center of each working opening.

26. In glass-drawing apparatus, the combination of a receptacle for molten glass, a vertically-reciprocating cross-head having a bait-support thereon, a tubular bait carried by said support, an air-conduit one end of which is carried by said cross-head, and means separably connecting said conduit and tubular bait.

27. In glass-drawing apparatus, the combination of a receptacle containing molten glass, a vertically-reciprocating cross-head having a plurality of bait-supports thereon, a tubular bait carried by one of said supports, an air-conduit one end of which is carried by said cross-head, and means separably connecting said conduit to said tubular bait when the latter is carried by either bait-support.

28. In glass-drawing apparatus, the combination of a receptacle for molten glass, a plurality of working openings therein, a vertically-reciprocating cross-head above said receptacle, a plurality of bait-supports on said cross-head, an air-conduit one end of which is carried by said cross-head, a tubular bait carried by one of said supports, and means separably connecting said bait and conduit.

29. The improvement in the art of glass-working which consists in preparing a mass of molten glass, drawing a cylinder of glass therefrom, subjecting the interior of the cylinder to gradually-increasing fluid-pressure during the drawing operation, and then severing the drawn cylinder from the molten mass.

30. The improvement in the art of glass-working which consists in drawing a cylinder from a mass of molten glass, subjecting the interior of the cylinder to atmospheric pressure at the beginning of the drawing operation, and then gradually increasing the interior pressure as the drawing operation proceeds.

31. The improvement in the art of glass-working which consists in drawing a cylinder from a mass of molten glass, subjecting the interior of the cylinder to constantly-increasing fluid-pressure as the drawing proceeds, then reducing the interior pressure below atmospheric pressure, and severing the cylinder from the molten mass.

32. The improvement in the art of glass-working which consists in drawing a cylinder from a mass of molten glass, subjecting the interior of the cylinder to fluid-pressure which pressure increases per unit of cylinder-surface in proportion as the length of the cylinder increases, and then severing the cylinder from the molten mass.

33. The improvement in the art of glass-working which consists in drawing a cylinder from a mass of molten glass, subjecting the interior of the cylinder to a fluid-pressure which increases per unit of surface during the drawing operation, then severing the cylinder from the molten mass.

34. The improvement in the art of glass-working which consists in drawing a cylinder from a mass of molten glass, subjecting the interior of the cylinder to a fluid-pressure which increases per unit of surface in proportion to the increase in the length of the cylinder, then reducing the interior pressure below atmospheric pressure and severing the cylinder from the molten mass.

35. The improvement in the art of working glass which consists in drawing a cylinder from a mass of molten glass, subjecting the interior of the cylinder to a fluid-pressure which gradually increases per unit of surface during the drawing operation, then reducing the interior pressure below atmospheric pressure and severing the cylinder from the molten mass.

36. The improvement in the art of glass-working which consists in drawing a cylinder from a mass of molten glass, subjecting the same to internal pressure during the drawing operation, then exhausting the air from the drawn cylinder, while continuing the drawing operation, thereby drawing the lower end of the cylinder to a point, and then severing the cylinder from the molten mass.

37. The improvement in the art of glass-working which consists in drawing a cylinder from a molten mass with an interior pressure not less than atmospheric pressure and then reducing the interior pressure below atmospheric pressure at the last end of the drawing operation, whereby the last end of the cylinder will be drawn to a point and severed from the molten mass.

In testimony whereof I have signed this specification in the presence of two subscribing witnesses.

IRVING W. COLBURN.

Witnesses:
 E. WASHBURN,
 THOMAS MCGOUGH.